US007865753B2

(12) United States Patent
Alexander et al.

(10) Patent No.: US 7,865,753 B2
(45) Date of Patent: Jan. 4, 2011

(54) RESOURCE POWER CONTROLLER TO RETURN A RESOURCE TO AN UP STATE BASED ON AN ESTIMATE OF A SIZE OF A GAP IN DATA TRAFFIC

(75) Inventors: James W. Alexander, Aloha, OR (US); Krishna Kant, Portland, OR (US); Rahul Khanna, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 832 days.

(21) Appl. No.: 11/728,993

(22) Filed: Mar. 28, 2007

(65) Prior Publication Data

US 2008/0244291 A1    Oct. 2, 2008

(51) Int. Cl.
*G06F 1/00*    (2006.01)
*G06F 1/32*    (2006.01)

(52) U.S. Cl. .................. 713/323; 713/300; 713/320

(58) Field of Classification Search ................. 713/300, 713/323

See application file for complete search history.

(56) References Cited

U.S. PATENT DOCUMENTS

| 5,612,950 | A | * | 3/1997 | Young ........................ 370/276 |
| 5,687,371 | A | * | 11/1997 | Lee et al. ........................ 713/1 |
| 5,805,597 | A | * | 9/1998 | Edem ........................ 370/445 |
| 5,968,147 | A | * | 10/1999 | Polfer et al. .................. 710/52 |
| 6,606,721 | B1 | * | 8/2003 | Gowin et al. ................. 714/728 |
| 7,408,878 | B2 | * | 8/2008 | Evans et al. ................. 370/232 |
| 7,487,374 | B2 | * | 2/2009 | Liu et al. .................... 713/323 |
| 2006/0156043 | A1 | * | 7/2006 | Liu et al. .................... 713/300 |

* cited by examiner

*Primary Examiner*—Suresh K Suryawanshi
(74) *Attorney, Agent, or Firm*—Blakely, Sokoloff, Taylor & Zafman LLP (57) ABSTRACT

Embodiments of the invention are generally directed to systems, methods, and apparatuses for a resource power controller. In some embodiments, an integrated circuit includes a resource power controller to control whether a resource is in an up state or a down state. In some embodiments, the resource power controller heuristically estimates when to return the resource to an up state based, at least in part, on an estimate of a gap size.

30 Claims, 9 Drawing Sheets

```
maxerror = 2^numerrorbits - 1 - 1
IF      RESET OR disable OR snub
THEN    error = 0
ELSE    ON strobe ~> NOT(strobe):
            IF      NOT(freeze)
            THEN    dec AND NOT(skid)
                    FLOOR(error - -, -maxerror-1)
                    ok = error <= 0
            ELSE    CEILING(error += val, maxerror)
                    busted = error > val
            ENDIF
        ENDON
ENDIF
```

```
maxrate = 2^(numratebits - 1)
IF    RESET OR disable
THEN rate = 1
ELSE ON strobe ~> NOT(strobe):
         IF    NOT(freeze)
         THEN IF    x2 OR snub
              THEN CEILING(rate *= 2, maxrate)
              ELSE IF    d2
                   THEN FLOOR(rate /= 2, 1)
                   ELSE rate = 1
                   ENDIF
              ENDIF
         ENDIF
     ENDON
ENDIF
```

```
IF      RESET OR disable
THEN        delay = floor
            floored = 1
ELSE    ON strobe ~> NOT(strobe):
            IF      up OR snub
            THEN        add
                        CEILING(delay += val, maxdly)
                        maxed = delay >= maxdly
                        FLOOR(delay, floor)
                    ELSE
                    ENDIF
                        busted
                        FLOOR(delay /= 2, floor)
                        floored = delay <= floor
                    ELSE
                        delay -= oldval
                    ENDIF
        ENDON
ENDIF
```

```
IF      RESET
THEN    dwell = 0
ELSE    ON NOT(strobe) ~> strobe:
            1. {dwell = 0
                elapsed = 0
                snub = 0
                skid = ondly > 0}
            2. {DO WHILE dwell <= maxdly
                dwell ++
                IF    dwell = val
                THEN  elapsed = 1
                ENDIF
                IF    dwell = ondly
                THEN  skid = 0
                ENDIF
                IF    dwell = maxdly
                THEN  snub = 1
                ENDIF
            ENDDO}
        ENDON
        Note: "ON" condition aborts step 2. back to step 1.
ENDIF
```

```
IF          RESET
THEN          start = 0
              stop = 0
ELSE        DOWN
              stop = 0
              IF        NOT(qmt)
                        OR
                        (NOT(react)
                        AND
                        NOT(snub)
                        AND
                        elapsed)
              THEN      start = 1
              ENDIF
            UP
              start = 0
              IF        NOT(cover)
                        AND   (snub
                        OR
                        (NOT(react)
                        AND qmt)
                        OR
                        (react
                        AND
                        elapsed))
              THEN      stop = 1
              ENDIF
  ENDIF
  deepok = maxed
```

RESOURCE POWER CONTROLLER TO RETURN A RESOURCE TO AN UP STATE BASED ON AN ESTIMATE OF A SIZE OF A GAP IN DATA TRAFFIC

TECHNICAL FIELD

Embodiments of the invention generally relate to the field of integrated circuits and, more particularly, to systems, methods and apparatuses for a resource power controller.

BACKGROUND

Links (and other resources) consume power whenever they are "up," at a level that is relatively independent of the data pattern associated with the link. That is, regardless of whether data is being transmitted or received on a link, the power consumed by the link remains substantially the same. Conventional systems use a link down state policy to regulate power by transitioning the link to a down state during the gaps between bursts of data. The links are typically transitioned back to an up state after the next burst of data is ready to be transmitted. The exit transition latency may incur a performance penalty.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to systems, methods, and apparatuses for a resource power controller. In some embodiments, the resource power controller efficiently exercises the power states of a resource while also regulating average idle latency. This enables a reduction in the average power consumed by a resource while having minimal performance impact.

A heuristic is employed that not only turns the resource off, when it is not in use, but also estimates when in time the resource will be required again. In some embodiments, accurate estimates are rewarded by leaving the resource off for a longer period during the next down state. Inaccurate estimates may be punished by reducing the length of the next down state.

Figure 1:
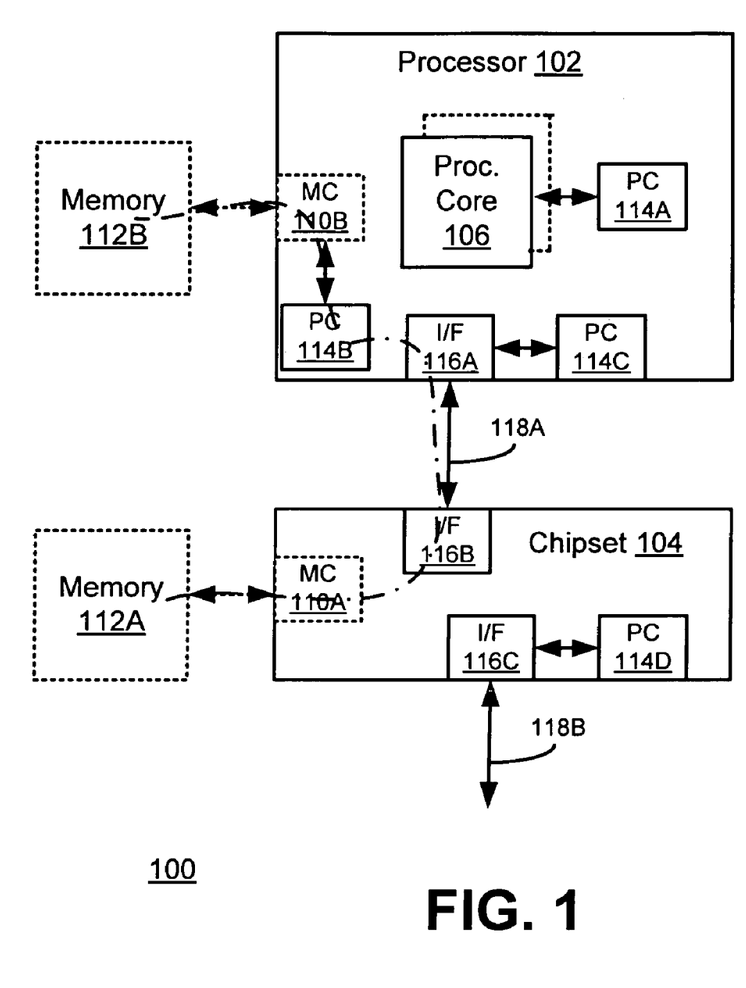
FIG. 1 is a high-level block diagram illustrating selected aspects of a computing system implemented according to an embodiment of the invention.

FIG. 1 is a high-level block diagram illustrating selected aspects of a computing system implemented according to an embodiment of the invention. System 100 includes processor 102 and chipset 104. Processor 102 may be any of a wide range of processors including a general purpose processor, a graphics processor, an application specific processor, and the like. Processor 102 may include virtually any number (e.g., 1, 2, 4, 8, etc.) of processor cores 106. In addition, system 100 may include more than one processor 102.

Chipset 104 may include one or more integrated circuits to connect processor 102 to the other elements of system 100. For example, in some embodiments, chipset 104 includes memory controller 110A to provide an interface to main memory 112A. In some alternative embodiments, the memory controller (e.g., memory controller 110B) is integrated onto the same die as processor 102 (and provides an interface to main memory 112B).

In some embodiments, system 100 includes one or more resource power controllers 114. A "resource power controller" refers to circuitry capable of controlling the power state of a resource. A "resource" refers to circuitry that provides a benefit and consumes power. In addition, a resource typically includes a mechanism to obtain a performance to power ratio benefit by, for example, changing the state of the resource. The term "power state" broadly refers to the various states used to alter the power to performance ratio of a resource. Examples of a power state include (and are not limited to): link states such as L0, L0s, L1, etc.; processor states such as C0, C2, C3, C6, etc.; and memory states such as CKE on, CKE off, etc. The term "up state" broadly refers to a power state in which a resource continues to transmit (and/or process) data (e.g., L0, CKE on, C0, etc.). Similarly, the term "down state" broadly refers to a power state in which a resource does not (in general) transmit (and/or process) data (e.g., L0s, L1, CKE off, C2, etc.).

Data traffic (and/or processing) is frequently characterized by bursts interspersed with gaps. The ability to quickly initiate a new burst on demand is crucial to performance for workloads that are sensitive to idle latency. If a resource remains in an up state during a gap, then idle power as well as thermal design power (TDP) may be unnecessarily penalized. The power usage of a resource can be optimized by transferring to a down state during a gap. A high exit latency, however, is incurred during the transition from the down state to the up state. In some embodiments, once a resource has entered a gap, resource power controller 114 heuristically estimates when to exit back to the up state before the actual demand appears. In some embodiments, a relatively modest loss in the amount of power savings is balanced against the reduction in average idle latency. Selected aspects of an example of the structure and operation of a resource power controller 114 are discussed below with reference to FIGS. 2-8.

System 100 provides various examples of how a resource power controller may be used, according to some embodiments of the invention. For example, resource power controller 114C controls the power states of interface 116A (and link 118A) based on an estimate of how long a gap in data traffic on the processor link (or bus, interconnect, etc.) is going to be. Similarly, resource power controller 114D controls the power states of interface 116C (and link 118B) based on an estimate of how long a gap in the data traffic on an input/output link (or bus, interconnect, etc.) is going to be. In some embodiments, resource power controller 114B controls the power states of one or more ranks of memory devices (in main memory 112)

based on an estimate of how long a gap in memory traffic is going to be. A memory rank is the set of memory devices connected to a common logical clock-enable (CKE) signal. Resource power controller 114A may control the power state of processor cote 106 based on an estimate of how long a gap in demand for processing data is going to be.

It is to be appreciated that system 100 may use nearly any number of resource power controllers 114 (e.g., 1, 2, 3, etc.) to control virtually any number of resources. In addition, a resource power controller may control the power state of more than one resource.

Figure 2:
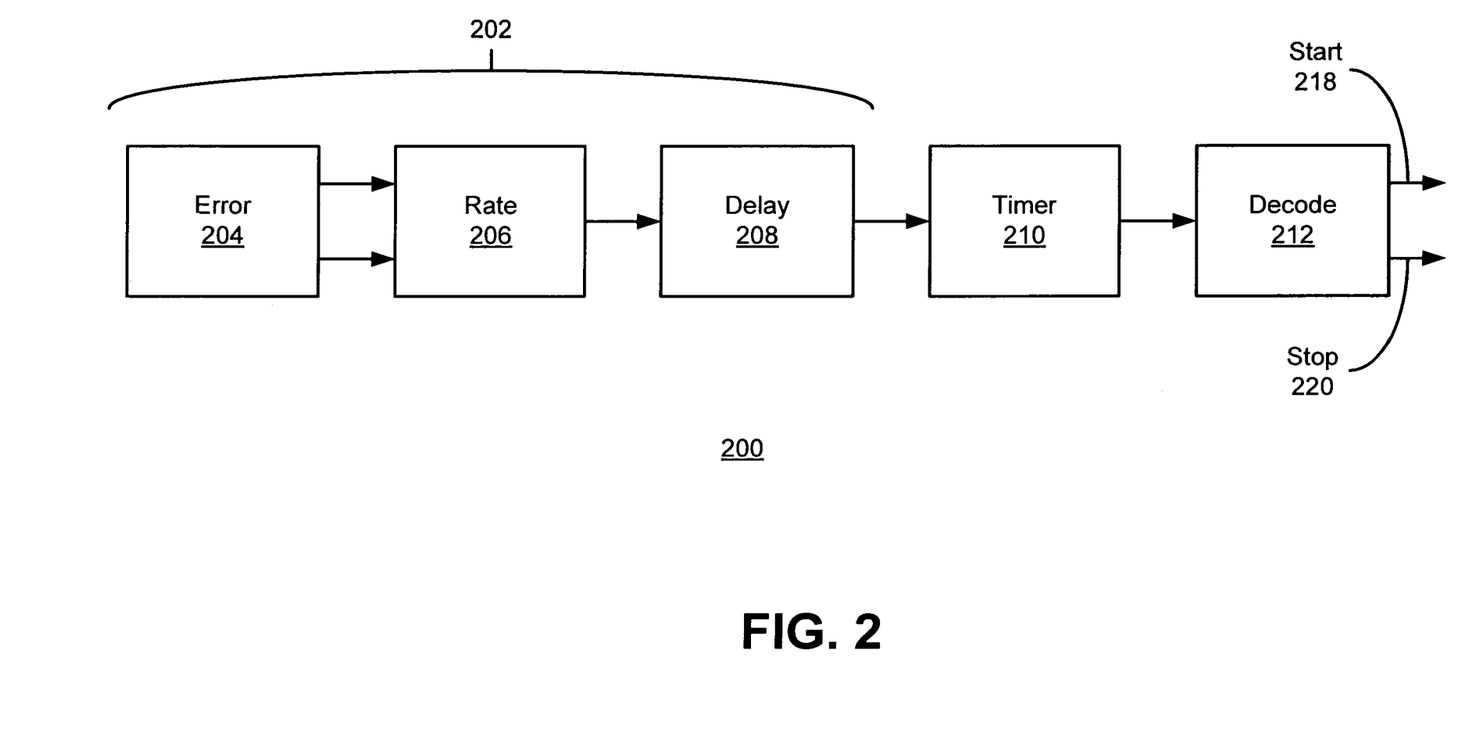
FIG. 2 is a high-level block diagram illustrating selected aspects of a resource power controller, implemented according to an embodiment of the invention.

FIG. 2 is a high-level block diagram illustrating selected aspects of a resource power controller, implemented according to an embodiment of the invention. Resource power controller 200 includes delay estimator 202, timer 210, and decoder 212. In an alternative embodiment, resource power controller 200 may include more elements, fewer elements, and/or different elements.

Delay estimator 202 provides an estimate of a gap size. The estimate is heuristically determined based, at least in part, on how accurate a previous estimate of the gap size was. In the illustrated embodiment, delay estimator 202 includes error logic 204, rate logic 206, and delay logic 208. In an alternative embodiment, delay estimator 202 may include more elements, fewer elements, and/or different elements.

In some embodiments, error logic 204 tracks the amount of error in previous gap size estimates. Error logic 204 may have an error budget that is used to determine whether the amount of error exceeds acceptable limits. Accurate estimates may result in an increase in the error budget. Similarly, inaccurate estimates may result in a decrease in the error budget. Error logic 204 may provide information to rate logic 206 that indicates, for example, whether the error budget has been exceeded.

Rate logic 206 provides an estimate of how much the rate should change after each down event. In some embodiments, rate logic may be capable of making a number of specific changes to the rate based on various conditions. For example, rate logic 206 may be able to increase the rate, decrease the rate, take on a previous value, and/or set the rate to a floor value. Rate logic 206 may provide a rate value to delay logic 208.

In some embodiments, delay logic 208 includes circuitry to estimate a gap size based, for example, on inputs from rate logic 206 and/or error logic 204. For example, delay logic 208 may increase or decrease its estimate of the gap size based, at least in part, on information from error logic 204 that indicates performance to an error budget. Similarly, delay logic 208 may increase or decrease its estimate of the gap size based, at least in part, on information provided by rate logic 206 that indicates what rate to use. Delay logic 208 provides an input to timer 210.

Timer 210 provides a timer to mark the end of the estimate of the gap length. In some embodiments, the output of delay logic 208 determines the period of timer 210. In some embodiments, timer 210 generates a time ramp that hits various thresholds. These thresholds may be used to, for example, mark: the end of the runway (e.g., where a link is transitioned to a low power state); when to exit the down state (e.g., when the timer expires); and the like.

Timer 210 may signal decode logic 212 when certain thresholds are reached (e.g., when the timer expires). Decode logic 212 provides, for example, start signal 218 and stop signal 220 to one or more resources (not shown). Start signal 218 may be used to transition a resource from a down state to an up state. Similarly, stop signal 220 may be used to transition a resource from an up state to a down state.

The pseudocode shown below provides a high-level example of the operation of a resource power controller according to an embodiment of the invention. The illustrated pseudocode is directed to an embodiment in which the resource is a link (or the interface to a link). It is to be appreciated that a similar heuristic may be applied to a wide range of resources. In an alternative embodiment, the operation of a resource power controller may be different.

---

PSEUDOCODE - HIGH-LEVEL OPERATION OF A
RESOURCE POWER CONTROLLER

WHEN a traffic burst starts and the resource is not IDLE anymore,
THEN START the resource if you have to.
   IF   the resource was already UP
   THEN reduce the ERROR a little bit.
      IF   the ERROR is fine
      THEN double the RATE
         and add the RATE to the DELAY.
      ELSE the ERROR is not fine
      SO   cut the RATE in half
         but do not change the DELAY.
   ELSE the resource was DOWN
   SO   increase the ERROR a lot.
      IF   the ERROR is not BUSTED
      THEN remember the RATE that you added to the DELAY
      last time?
         well, subtract it back off,
         and cut the RATE in half.
      ELSE the ERROR is BUSTED
         so reset the RATE
         and cut the DELAY in half.
WHEN the burst ends and resource goes IDLE
THEN start the DWELL timer and WAIT a little while
IF the resource is still IDLE
THEN STOP the resource.
   WAIT for the DWELL to ELAPSE.
   START the resource again.
IF the resource remains IDLE for too long
THEN STOP the resource again.

---

Figure 3:
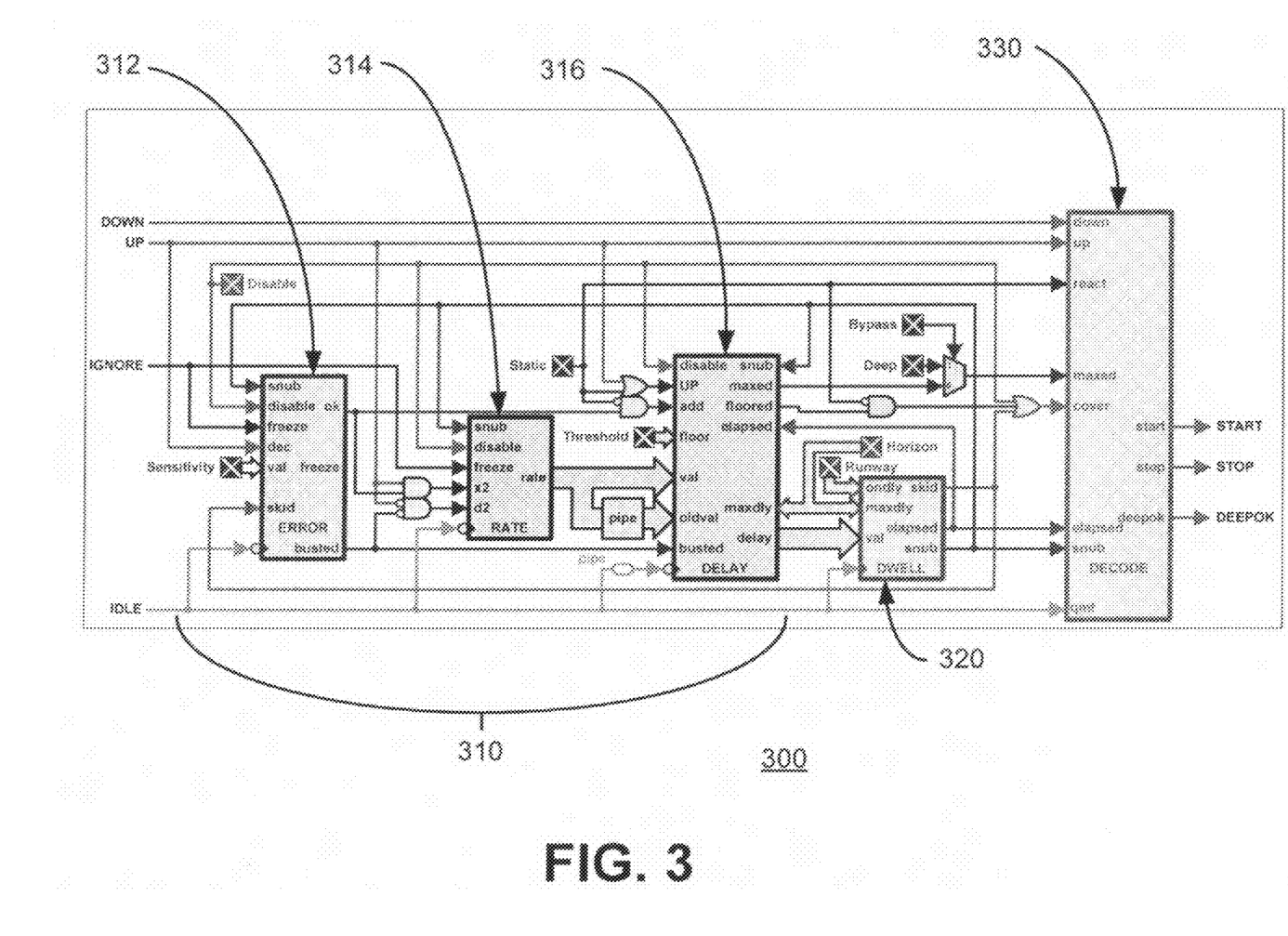
FIG. 3 is a block diagram illustrating selected aspects of a resource power controller, implemented according to an embodiment of the invention.
Figure 4:
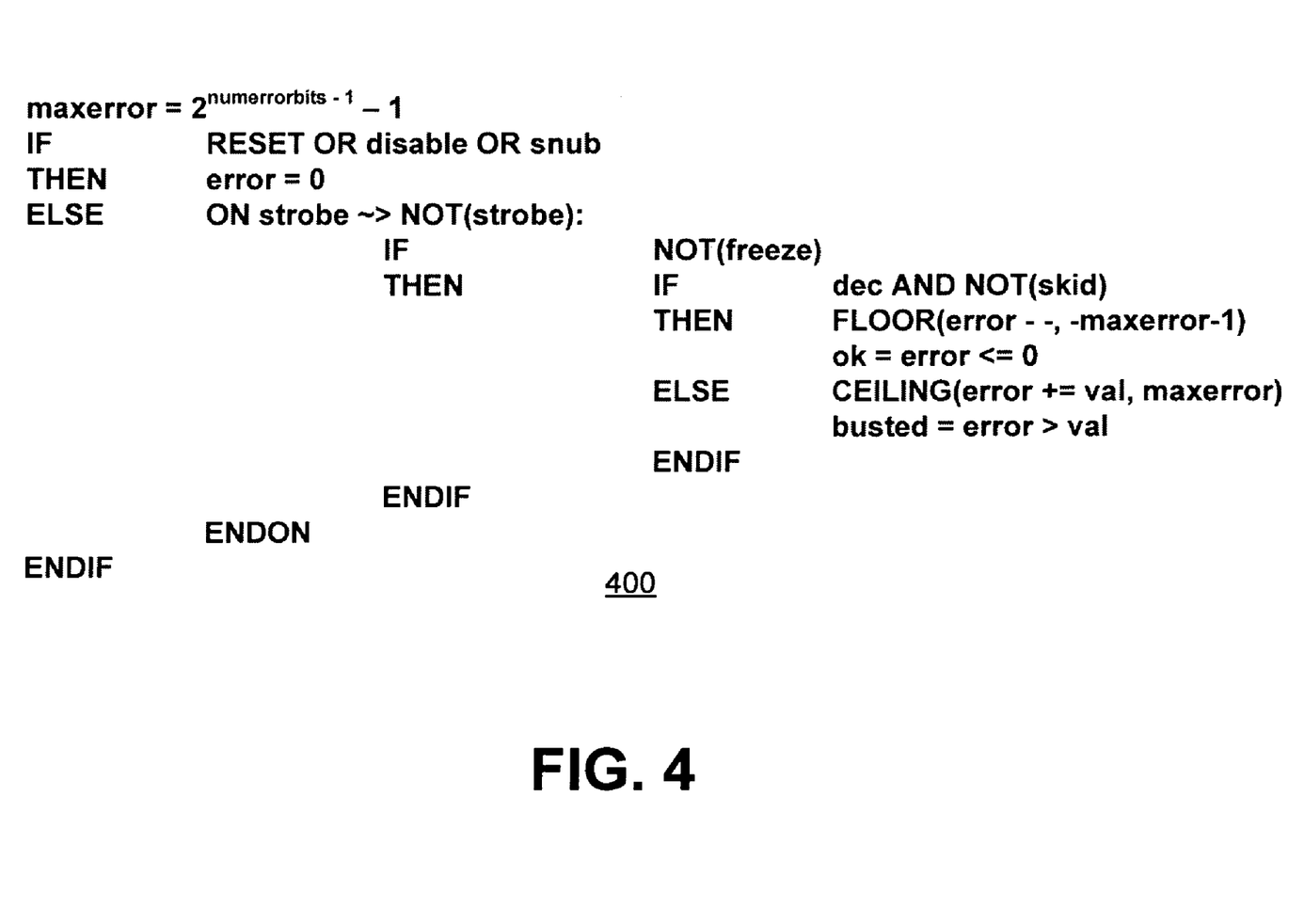
FIG. 4 illustrates an example of pseudocode for error logic, according to an embodiment of the invention.
Figure 5:
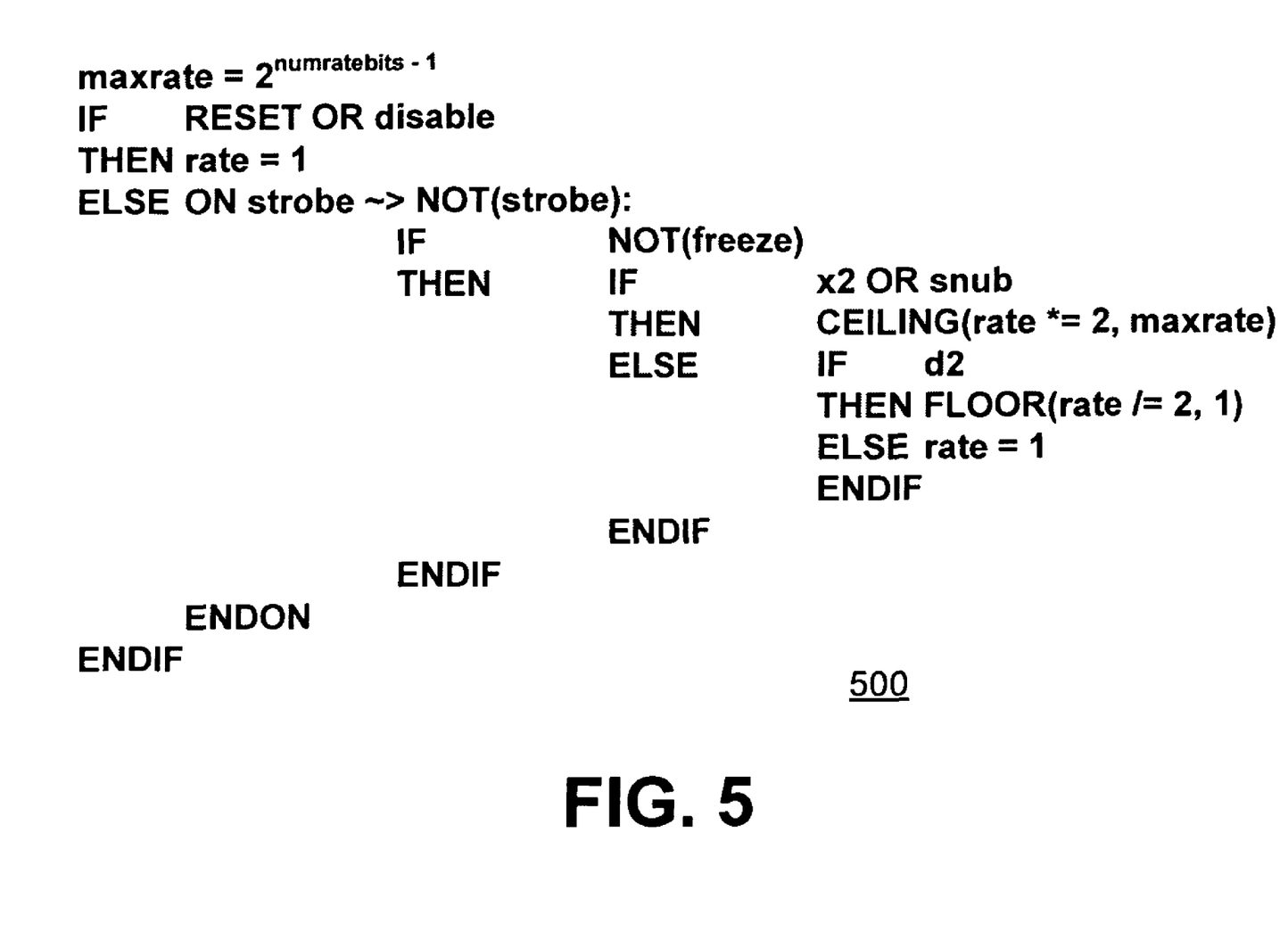
FIG. 5 illustrates an example of pseudocode for rate logic, according to an embodiment of the invention.
Figure 6:
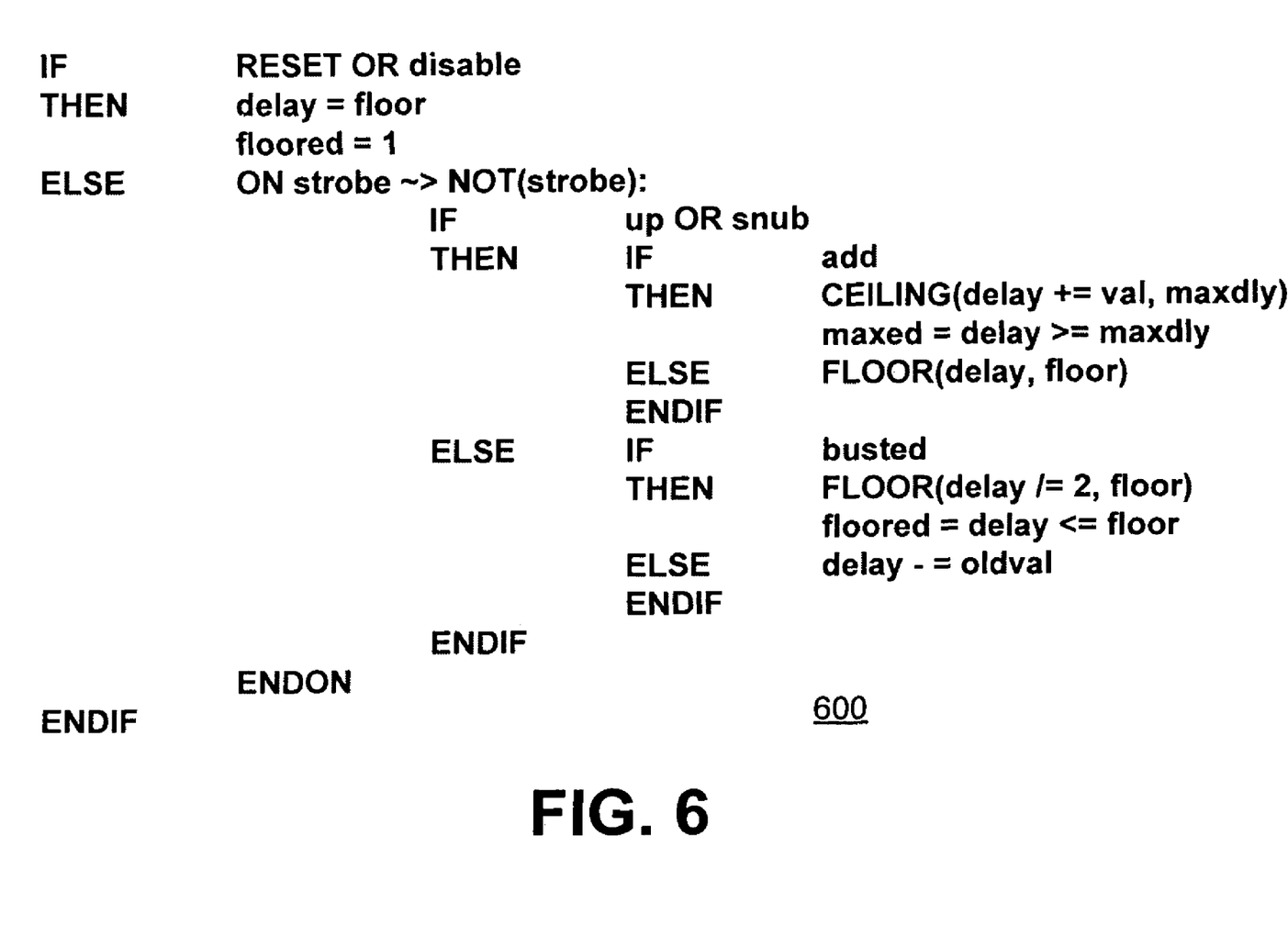
FIG. 6 illustrates an example of pseudocode for delay logic, according to an embodiment of the invention.
Figure 7:
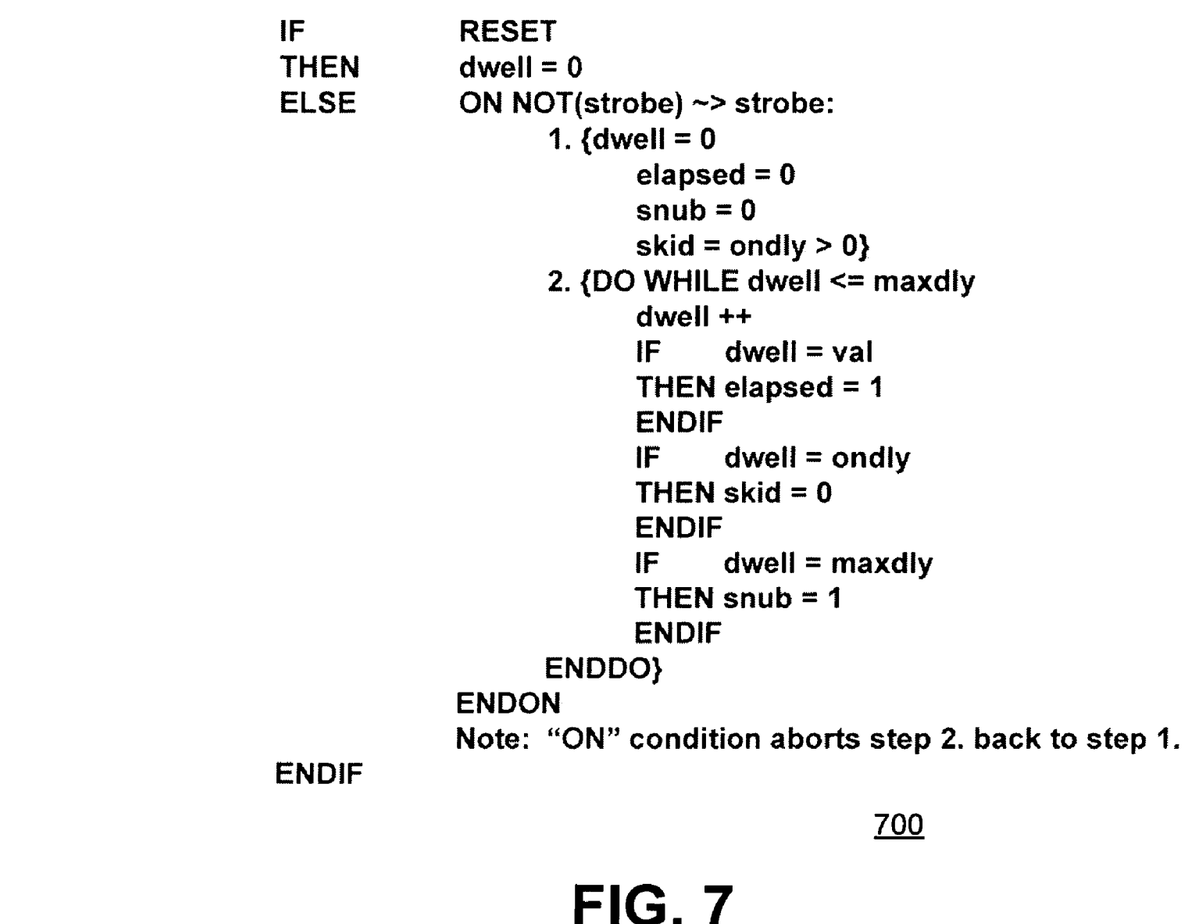
FIG. 7 illustrates an example of pseudocode for a timer, according to an embodiment of the invention.
Figure 8:
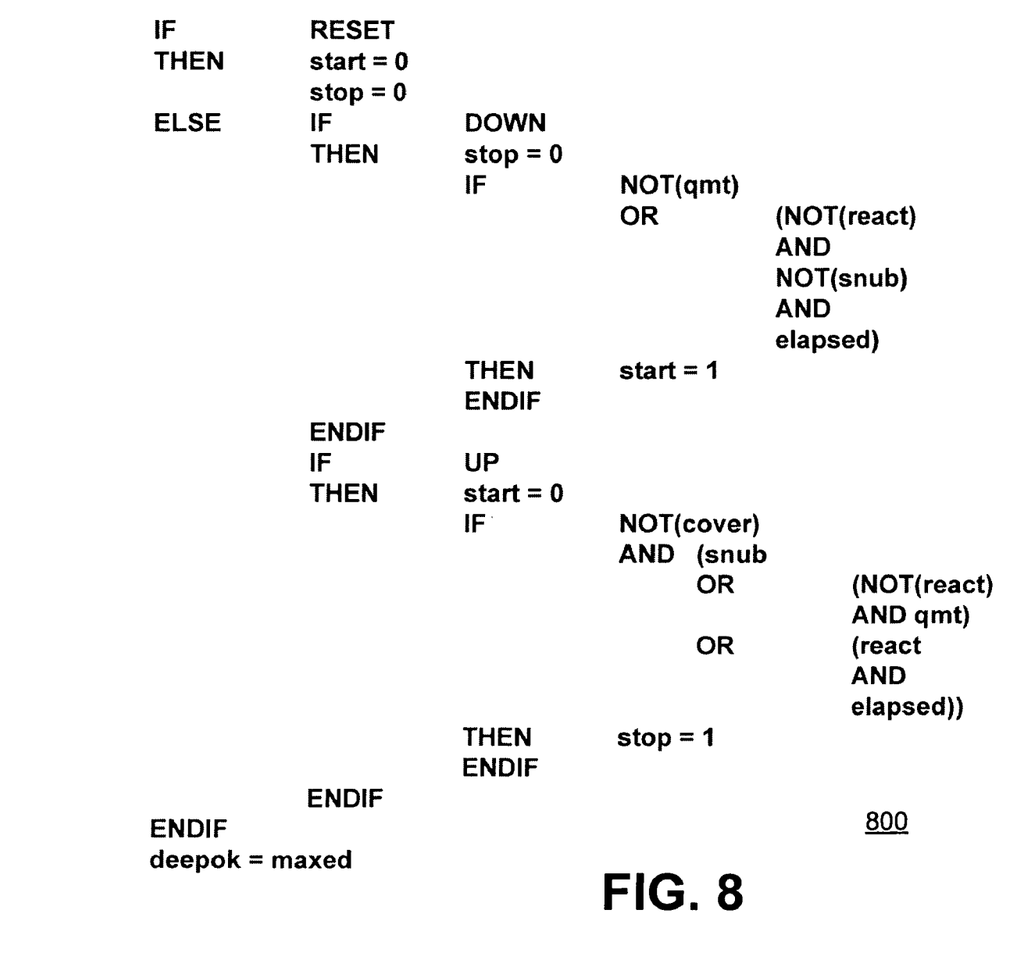
FIG. 8 illustrates an example of pseudocode for decode logic, according to an embodiment of the invention.

FIG. 3 is a block diagram illustrating selected aspects of a resource power controller, implemented according to an embodiment of the invention. Resource power controller 300 includes delay estimator 310, timer 320, and decode logic 330. In alternative embodiments, resource power controller 300 may include more elements, fewer elements, and/or different elements.

Delay estimator 310 provides an estimate of the gap size for a data pattern associated with a resource. The estimate may be based, in part, on previous estimates of the gap size. Delay estimator 310 may also maintain an error penalty due to the inaccuracy of previous estimates. An inaccurate estimate may result in timer 320 being set too high which may, in turn, lead to new demand for a resource arriving before the down-to-up transition is initiated or completed.

Delay estimator 310 may be given an error budget (e.g., the "sensitivity" value). If the error in the previous gap size estimate is too high, the gap size estimate for the next gap may be reduced. If the error in the previous gap size estimate is low, then the gap size estimate is allowed to rise. Accurate gap size estimates (e.g., resulting in zero latency impact) reduce the error penalty. Hence, a positive error penalty amortized over many accurate estimates shrinks. When an inaccurate estimate occurs, the sensitivity is added to the penalty and the penalty grows.

In the illustrated embodiment, delay estimator 310 includes error logic 312, rate logic 314, and delay logic 316. In alternative embodiments, delay estimator 310 may include more elements, fewer elements, and/or different elements. Error logic 312 determines how accurate one or more previous estimates were. In some embodiments, error logic 312 maintains an error budget that may be increased or decreased depending on the accuracy of previous gap estimates. Pseudocode 400 (shown in FIG. 4) provides an example of the logic that may be implemented in error logic 312. In alternative embodiments, error logic 312 may implement different logic.

Rate logic 314 determines, in part, the amount by which a gap estimate is changed. This enables delay estimator 310 to more quickly close the gap between the estimated gap and the actual gap under certain conditions (e.g., when the gap size estimate is initialized at zero). Similarly, it enables delay estimator 310 to reduce the amount by which it varies the estimate under certain conditions (e.g., when the previous estimate of the gap size was relatively close to the actual gap size). Pseudocode 500 (shown in FIG. 5) provides an example of the logic that may be implemented in rate logic 314. In alternative embodiments, rate logic 314 may implement different logic.

Delay logic 316 controls timer 320 based, in part, on an error value from error logic 312 and a rate value from rate logic 314. This enables delay logic 316 to estimate a successive gap size (e.g., by controlling timer 320) based on how accurate previous estimates were (e.g., using the error and rate information). Pseudocode 600 (shown in FIG. 6) provides an example of the logic that may be implemented in delay logic 316. In alternative embodiments, delay logic 316 may implement different logic.

Timer 320 determines when an estimate of a gap size has elapsed. For example, timer 320 may provide the ELAPSED signal to decode logic 330. Decode logic 330 may, in turn, transition a resource (or resources) from a down state to an up state responsive, at least in part, to the ELAPSED signal. Pseudocode 700 (shown in FIG. 7) provides an example of the logic that may be implemented in timer 320. In alternative embodiments, timer 320 may implement different logic.

Table 1 provides a brief description of the some of the signals used in resource power controller 300.

TABLE 1

| Signal Name | Description |
|---|---|
| QMT | Equals 1 when there is no traffic to send. |
| UP | Equals 1 when the resource is immediately available. |
| DOWN | Equals 1 when the resource has completely quiesced to its off state. |
| STOP | Tells the resource to transition to a down state. The STOP signal may remain asserted until the DOWN signal asserts. |
| START | Tells the resource to transition to an up state. The START signal may remain asserted until the UP signal asserts. |
| DEEPOK | DEEPOK is asserted when the "deeper" behavior is in force. |

In the embodiment illustrated in FIG. 3, the pipe in the QMT path is placed so that ERROR and RATE update first. Subsequently, DELAY updates based on the updated values of ERROR and RATE (on the de-assertion of QMT). The pipe in the RATE path provides the previous RATE to the DELAY calculation. Thus, the delay calculation occurs at the end of the gap, with the newly calculated delay ready-to-go at the beginning of the next gap. In some embodiments, timer 320 starts at the beginning of a gap (e.g., when the queue goes empty).

The "static" value holds the delay constant at the threshold. This "chicken switch" turns the mechanism into a familiar constant-delay-after-end-of-traffic before going down.

In some embodiments, the "bypass" and "deep" switches provide the following functionality.
  a) The "bypass" switch selects the "deeper" behavior.
    a1. If "bypass"=1, then the "deeper" behavior is always invoked, if "deep"=1, and is never invoked when "deep"=0.
    a2. If "bypass"=0, then the "deeper" behavior is invoked when the DELAY accumulator value is greater than or equal to the "horizon" control.

The deeper behavior refers to placing the resource into a deeper power-saving state which imposes a longer transition latency. When the "deeper" behavior is in force, the DEEPOK output is asserted.

In some embodiments, the "horizon" value sets the do-not-care-what-happens-beyond-this-delay level. If the delay is not equal to the "horizon" but timer 320 hits the "horizon" then, if the resource was up, it will be stopped. If the delay was equal to the "horizon," then the resource will not be started when timer 320 elapses.

Pseudocode 800 (shown in FIG. 8) provides an example of the logic that may be implemented in decode logic (e.g., decode logic 330, shown in FIG. 3). In alternative embodiments, decode logic 330 may implement different logic.

Figure 9A:
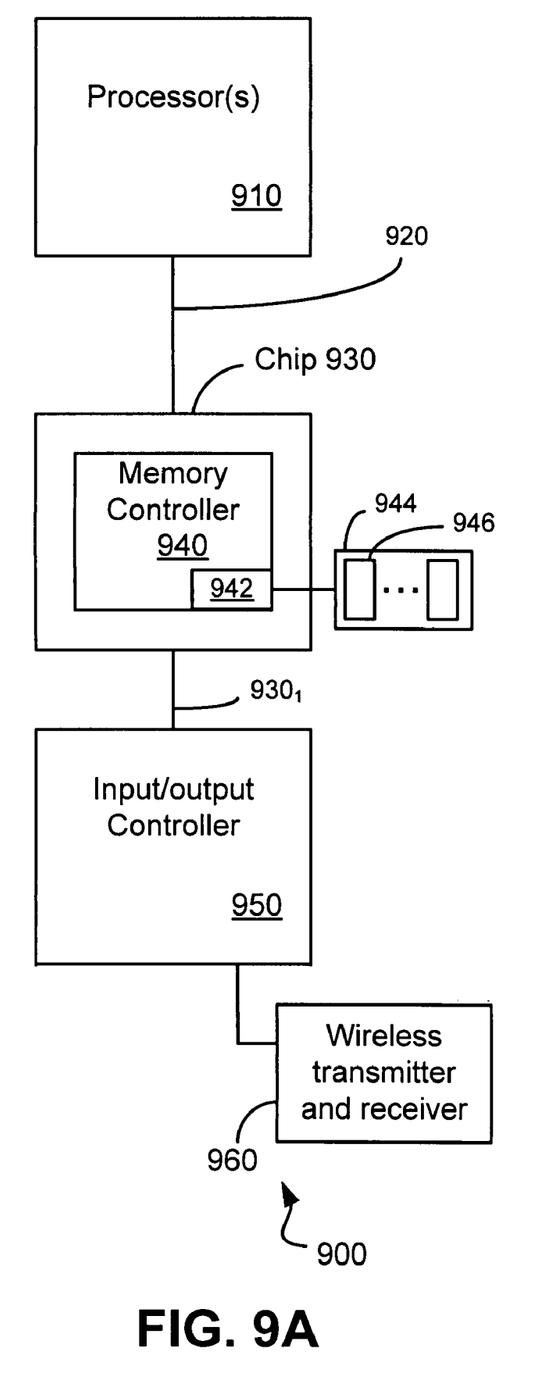
FIGS. 9A and 9B are block diagrams illustrating selected aspects of computing systems.
Figure 9B:
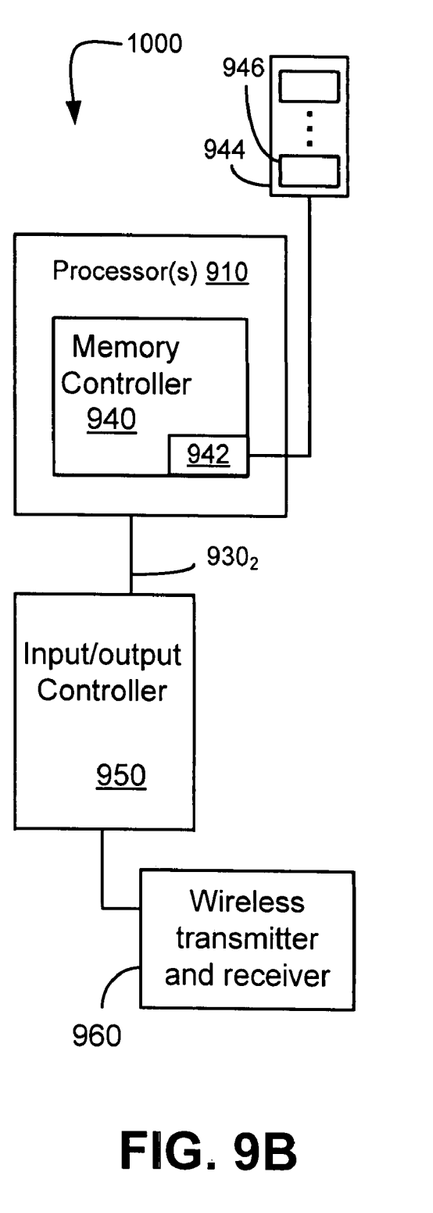

FIGS. 9A and 9B are block diagrams illustrating, respectively, selected aspects of computing systems 900 and 1000. Computing system 900 includes processor 910 coupled with an interconnect 920. In some embodiments, the term processor and central processing unit (CPU) may be used interchangeably. In one embodiment, processor 910 is a processor in the XEON® family of processors available from Intel Corporation of Santa Clara, Calif. In an alternative embodiment, other processors may be used. In some embodiments, processor 910 may include multiple processor cores.

In one embodiment, chip 930 is a component of a chipset. Interconnect 920 may be a point-to-point interconnect or it may be connected to two or more chips (e.g., of the chipset). Chip 930 includes memory controller 940 which may be coupled with main system memory (e.g., as shown in FIG. 1). In an alternative embodiment, memory controller 940 may be on the same chip as processor 910 as shown in FIG. 9B.

Memory system 944 may provide main memory for computing system 900 (and computing system 1000). In the illustrated embodiment, memory system 944 includes memory devices 946. In some embodiments, resource power controller 942 controls the power states of memory devices 946 based on an estimate of a gap size in the data pattern for accessed data.

Input/output (I/O) controller 950 controls the flow of data between processor 910 and one or more I/O interfaces (e.g., wired and wireless network interfaces) and/or I/O devices. For example, in the illustrated embodiment, I/O controller 950 controls the flow of data between processor 910 and wireless transmitter and receiver 960. In an alternative embodiment, memory controller 940 and I/O controller 950 may be integrated into a single controller.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. An integrated circuit comprising:
   a resource power controller to control whether a resource is in an up state or a down state, wherein the resource power controller heuristically estimates when to return the resource to an up state based, at least in part, on an estimate of a size of a gap in data traffic.

2. The integrated circuit of claim 1, wherein the resource power controller comprises:
   a delay estimator circuit; and
   a timer.

3. The integrated circuit of claim 2, wherein the delay estimator circuit is capable of estimating the size of the gap in data traffic.

4. The integrated circuit of claim 3, wherein the delay estimator circuit includes:
   an error circuit to provide an error value corresponding to the estimate of the size of the gap in data traffic.

5. The integrated circuit of claim 3, wherein the delay estimator circuit further includes:
   a rate circuit to provide a rate value based, at least in part, on the error value.

6. The integrated circuit of claim 3, wherein the delay estimator circuit further includes:
   a delay circuit to provide a delay value based, at least in part, on the rate value.

7. The integrated circuit of claim 1, wherein the resource is an interface circuit.

8. The integrated circuit of claim 7, wherein the interface circuit is one of:
   a cache coherent interface circuit;
   a peripheral component interface express (PCIE) circuit;
   a fully-buffered dual inline memory module (FB-DIMM) interface circuit; and
   a double data rate (DDR) interface circuit.

9. The integrated circuit of claim 1, wherein the resource comprises core logic of an integrated circuit.

10. The integrated circuit of claim 9, wherein the resource is one of:
    a processor core; and
    a memory.

11. A system comprising:
    a memory; and
    a host coupled to the memory, the host including a resource power controller to control whether the memory is in an up state or a down state, wherein the resource power controller heuristically estimates when to return the memory to an up state based, at least in part, on an estimate of a length of a gap in data traffic.

12. The system of claim 11, further comprising:
    an interconnect coupled between the host and the memory.

13. The system of claim 12, wherein the interconnect is based, at least in part, on one of the double data rate (DDR) specifications.

14. The system of claim 12, wherein the interconnect is based, at least in part, on one of the fully-buffered dual inline memory module (FB-DIMM) specifications.

15. A method comprising:
    updating an estimate of a size of a gap in data traffic, the updating based, at least in part, on an error value associated with a previous estimate of a size of a gap in data traffic; and
    transitioning a resource from a down state to an up state based, at least in part, on the updated estimate of the size of the gap in data traffic.

16. The method of claim 15, further comprising:
    updating the error value based, at least in part, on the previous estimate of the size of the gap in data traffic.

17. The method of claim 15, wherein transitioning a resource from a down state to an up state comprises:
    transitioning an interface from a down state to an up state.

18. The method of claim 15, wherein transitioning a resource from a down state to an up state comprises:
    transitioning a memory agent from a down state to an up state.

19. The method of claim 15, wherein transitioning a resource from a down state to an up state comprises:
    transitioning a processor core from a down state to an up state.

20. A system comprising:
    a resource power controller to control whether a resource is in an up state or a down state, wherein the resource power controller heuristically estimates when to return the resource to an up state based, at least in part, on an estimate of a size of a gap in data traffic; and
    a resource coupled with the resource power controller.

21. The system of claim 20, wherein the resource power controller comprises:
    a delay estimator circuit; and
    a timer.

22. The system of claim 21, wherein the delay estimator circuit is capable of estimating the size of the gap in data traffic.

23. The system of claim 22, wherein the delay estimator circuit includes:
    an error circuit to provide an error value corresponding to the estimate of the size of the gap in data traffic.

24. The system of claim 22, wherein the delay estimator circuit further includes:

a rate circuit to provide a rate value based, at least in part, on the error value.

25. The system of claim 22, wherein the delay estimator circuit further includes:

a delay circuit to provide a delay value based, at least in part, on the rate value.

26. The system of claim 20, wherein the resource is an interface circuit.

27. The system of claim 26, wherein the interface circuit is one of:

a cache coherent interface circuit;

a peripheral component interface express (PCIE) circuit;

a fully-buffered dual inline memory module (FB-DIMM) interface circuit; and a double data rate (DDR) interface circuit.

28. The system of claim 20, wherein the resource comprises core logic of an integrated circuit.

29. The system of claim 28, wherein the resource is one of:

a processor core; and a memory.

30. The system of claim 20, wherein the resource and the resource power controller are on the same integrated circuit.

* * * * *